United States Patent
Rao et al.

(10) Patent No.: US 9,268,662 B2
(45) Date of Patent: Feb. 23, 2016

(54) METHOD AND SYSTEM FOR A HIGH AVAILABILITY FRAMEWORK

(71) Applicant: Oracle International Corporation, Redwood Shores, CA (US)

(72) Inventors: Pramod Nagaraja Rao, Bangalore (IN); Gia-Khanh Nguyen, Santa Clara, CA (US); Yue Lai, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 167 days.

(21) Appl. No.: 13/957,095

(22) Filed: Aug. 1, 2013

(65) Prior Publication Data
US 2015/0039946 A1    Feb. 5, 2015

(51) Int. Cl.
*G06F 11/00* (2006.01)
*G06F 11/30* (2006.01)
*G06F 11/14* (2006.01)
*G06F 11/20* (2006.01)

(52) U.S. Cl.
CPC ........ *G06F 11/3055* (2013.01); *G06F 11/1484* (2013.01); *G06F 11/20* (2013.01); *G06F 2201/865* (2013.01)

(58) Field of Classification Search
CPC ........................ G06F 11/0712; G06F 11/1484
USPC .................................................. 714/11, 2, 3
See application file for complete search history.

(56) References Cited

U.S. PATENT DOCUMENTS

| | | | |
|---|---|---|---|
| 5,805,785 A * | 9/1998 | Dias et al. ....................... 714/4.4 |
| 8,527,809 B1 * | 9/2013 | Backensto et al. .............. 714/15 |
| 8,775,861 B1 * | 7/2014 | Raizen et al. ................. 714/4.12 |
| 2003/0051048 A1 * | 3/2003 | Watson et al. ................. 709/238 |
| 2011/0138219 A1 * | 6/2011 | Walton et al. ..................... 714/3 |
| 2012/0066333 A1 * | 3/2012 | Browning et al. ............. 709/212 |
| 2012/0066556 A1 * | 3/2012 | Dufour et al. ................... 714/49 |
| 2014/0115606 A1 * | 4/2014 | Hamzata et al. .............. 719/313 |
| 2015/0058611 A1 * | 2/2015 | Reeves et al. ..................... 713/1 |

* cited by examiner

Primary Examiner — Kamini Patel
(74) Attorney, Agent, or Firm — Osha Liang LLP (57) ABSTRACT

A method for providing a high availability framework, comprises executing a first component of the high availability framework within a shared kernel based on a first operating system, executing a second component of the high availability framework within a first userland of the first operating system, and executing a third component of the high availability framework within a second userland of a second operating system, wherein the second operating system is an older version of the first operating system. The method further comprises monitoring, by a health service of the shared kernel, the first operating system and a first application executing within the first userland; and monitoring, by the health service, the second operating system and a second application executing within the second userland.

23 Claims, 4 Drawing Sheets

METHOD AND SYSTEM FOR A HIGH AVAILABILITY FRAMEWORK

BACKGROUND

Modern servers and computing systems run a variety of programs on a variety of operating systems. Traditionally, any given computer would run a single operating system. However, as the use of virtual machines spreads, a single computing system may run multiple operating systems, or even multiple versions of the same operating system. There are many ways to approach the problems presented by simultaneously executing different versions of the same operating system, and any solution that improves efficiency would provide a competitive advantage.

SUMMARY OF INVENTION

In general, in one or more embodiments, the invention relates to a method for providing a high availability framework, comprising: executing a first component of the high availability framework within a shared kernel, wherein the kernel is based on a first operating system; executing a second component of the high availability framework within a first userland of the first operating system; executing a third component of the high availability framework within a second userland of a second operating system, wherein the second operating system is an older version of the first operating system; monitoring, by a health service of the shared kernel, the first operating system and a first application executing within the first userland; and monitoring, by the health service, the second operating system and a second application executing within the second userland.

In general, in one or more embodiments, the invention relates to a non-transitory computer-readable medium (CRM) storing a plurality of instructions for providing a high availability framework, the plurality of instructions comprising functionality to: execute a first component of the high availability framework within a shared kernel, wherein the kernel is based on a first operating system; execute a second component of the high availability framework within a first userland of the first operating system; execute a third component of the high availability framework within a second userland of a second operating system, wherein the second operating system is an older version of the first operating system; monitor, by a health service of the shared kernel, the first operating system and a first application executing within the first userland; and monitor, by the health service, the second operating system and a second application executing within the second userland.

In general, in one or more embodiments, the invention relates to a system for providing a high availability framework, comprising: a plurality of nodes, each comprising a processor and a memory, the memory comprising instructions which, when executed by the processor, comprise functionality to: execute a first component of the high availability framework within a shared kernel, wherein the kernel is based on a first operating system; execute a second component of the high availability framework within a first userland of the first operating system; execute a third component of the high availability framework within a second userland of a second operating system, wherein the second operating system is an older version of the first operating system; monitor, by a health service of the shared kernel, the first operating system and a first application executing within the first userland; monitor, by the health service, the second operating system and a second application executing within the second userland; and a shared storage device, wherein the first operating system and the second operating system perform failure fencing on the shared storage device to maintain integrity of the shared storage device.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for providing a high availability framework. The high availability framework includes a first component executing within a shared kernel of a first operating system, a second component executing within a first userland of the first operating system, and a third component executing within a second userland of a second operating system. The second operating system is an older version of the first operating system. By configuring the high availability framework in this way a health service of the shared kernel is able to monitor a first application executing within the first userland and monitor a second application executing within the second userland.

Figure 1:
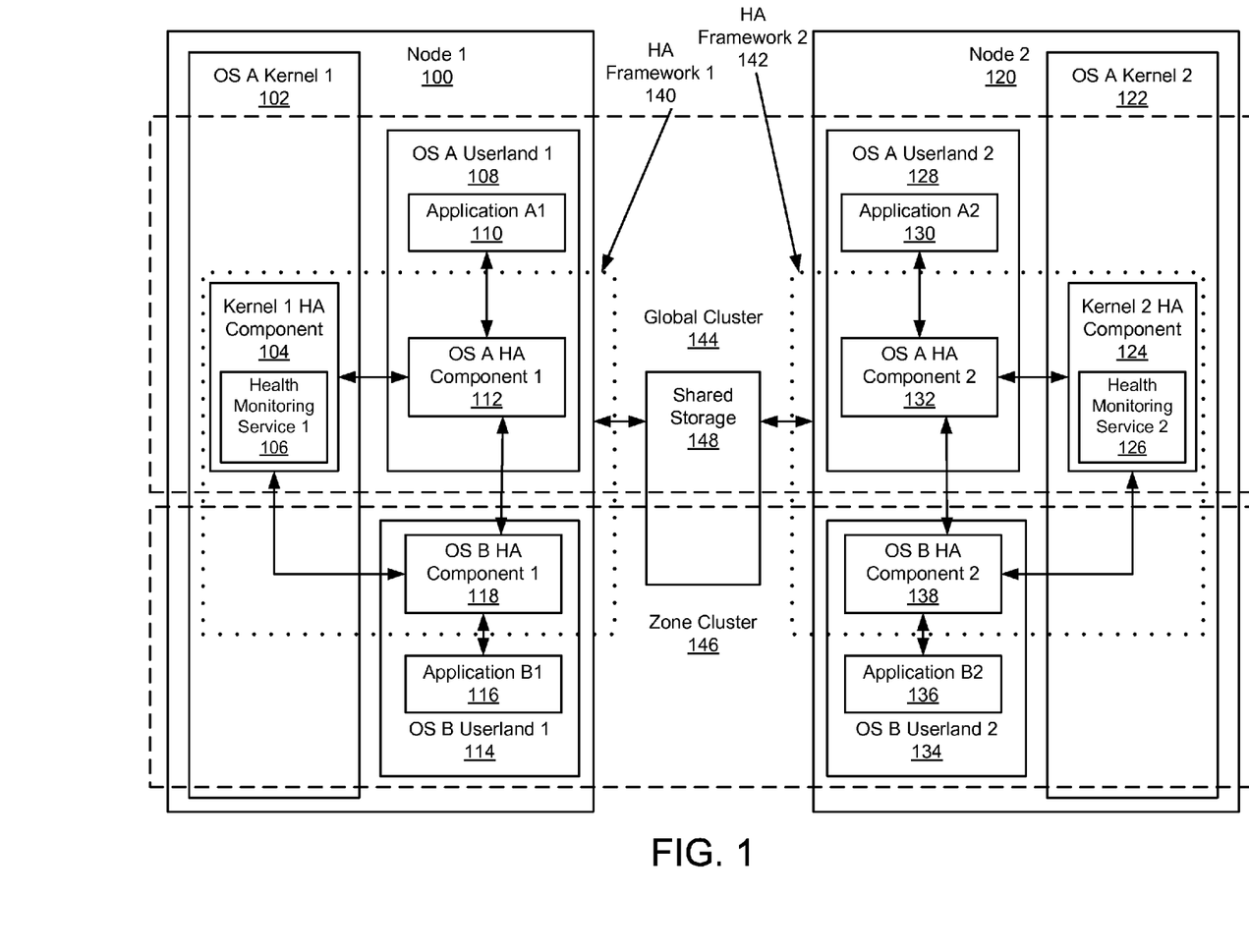
FIG. 1 shows a schematic diagram in accordance with one or more embodiments of the invention.

FIG. 1 shows a system for providing a high availability framework.

Specifically, FIG. 1 shows node 1 (100) and node 2 (120), which include OS A kernel 1 (102), kernel 1 HA component (104), Health monitoring service 1 (106), OS A userland 1 (108), application A1 (110), OS A HA component 1 (112), OS B userland 1 (114), application B1 (116), OS B HA component 1 (118), OS A kernel 2 (122), kernel 2 HA component (124), OS A userland 2 (128), application A2 (130), OS A HA component 2 (132), OS B userland 2 (134), application B2 (136), OS B HA component 2 (138), HA framework 1 (140), HA framework 2 (142), global cluster (144), and zone cluster (146). Node 1 (100) and node 2 (120) may be any computing system or device including, but not limited to: a server, a cluster, a desktop computer, a laptop, a tablet, a handheld gaming device, a smartphone, etc. Node 1 (100) and node 2 (120) may be nodes of a cluster computing system. In one or more embodiments of the invention, there may be any number of nodes, such as 5, 100, 1000, or more, and the invention should not be limited to the above examples. Further, node 1 (100) and node 2 (120) may be identical in terms of physical (i.e., hardware) components. Alternatively, node 1 (100) and node 2 (120) may be different in terms of physical (i.e., hardware) components. Likewise, node 1 (100) and node 2 (120) may be identical in terms of software components, or may have different software components installed. In one or more embodiments of the invention, node 1 (100) and node 2 (120) provide some degree of virtualization. For example, node 1 (100) and node 2 (120) may simultaneously execute two or more operating systems, which are each able to execute applications within their respective environments.

Specifically, in FIG. 1, there are two operating systems, OS A and OS B. In FIG. 1, OS A is a primary, or host, operating system, as it provides a shared kernel (i.e., OS A kernel 1 (102) and OS A kernel 2 (122)), while OS B is a secondary, or guest, operating system. Specifically, OS A and OS B are different versions (i.e., minor differences, such as a patch), revisions, and/or release versions (i.e., major changes) of the same operating system. Alternatively, OS A and OS B may be the same version, or may even be completely different operating systems. Operating system A kernel 1 (102) and operating system A kernel 2 (122) are kernels that provide the bridge between applications and/or programs and the actual processing performed on the hardware of node 1 (100) and node 2 (120). Kernels may provide functionality to only one operating system at a time, or may be a shared kernel that provides functionality to multiple operating systems. Typically, shared kernels may only support different instances of the same version of the operating system. However, the present invention enables a shared kernel to support a high availability framework for multiple versions of the same operating system or different operating system. In one or more embodiments of the invention, the operating system (i.e., OS A and OS B), may refer to only the userland components of an operating system. Alternatively, the operating system may provide both a userland and a kernel.

Specifically, the portion of operating system A kernel 1 (102) and operating system A kernel 2 (122) that is shared is the high availability framework (i.e., HA framework 1 (140) and HA framework 2 (142)), although other components may also be shared. HA framework 1 (140) and HA framework 2 (142) may include any functionality typically provided by a high availability framework such as a health monitoring service 1 (106), health monitoring service 2 (126), or other services. Specifically, HA framework 1 (140) and HA framework 2 (142) include HA components that reside within the kernel and/or userlands of the various operating systems. Specifically, kernel 1 HA component (104) and kernel 2 HA component (124) receive messages from the HA components that execute within a given userland (i.e., OS A userland 1 (108) and OS A HA component 1 (112); OS B userland 1 (114) and OS B HA component 1 (118); OS A userland 2 (128) and OS A HA component 2 (132); and OS B userland 2 (134) and OS B HA component 2 (138)). As needed, kernel 1 HA component (104) and kernel 2 HA component (124) are able to convert these messages if they are not of the proper format for the version of the operating system that provides the kernel. In other words, when messages are received from an older version of the operating system providing the kernel (i.e., OS B HA component 1 (118) and OS B HA component 2 (138)), kernel 1 HA component (104) and kernel 2 HA component (124) process those messages and are able to respond accordingly, as though the kernel was of the same version as the format in which the messages were received. This enables older versions of operating systems to leverage the kernel and high availability framework of a newer version of the same operating system.

In one or more embodiments of the invention, health monitoring service 1 (106) and health monitoring service 2 (126) are health monitoring services that execute within the kernels provided by the host operating system. Specifically, health monitoring service 1 (106) and health monitoring service 2 (126) include functionality to monitor the health of all userlands executing on node 1 (100) and node 2 (120), as well as monitor the health of the individual applications executing within the userlands.

OS A userland 1 (108) and OS A userland 2 (128) provide an execution environment for all operating system applications and programs of OS A that execute outside of the kernel (i.e., OS A kernel 1 (102) and OS A kernel 2 (122)). Within OS A userland 1 (108) are application A1 (110) and OS A HA component 1 (112), and within OS A userland 2 (128) are application A2 (130) and OS A HA component 2 (132). OS A HA component 1 (112) and OS A HA component 2 (132) are components of high availability frameworks that provide high availability features and functionality to programs executing within OS A userland 1 (108) and OS A userland 2 (128). OS A HA component 1 (112) and OS A HA component 2 (132) are communicatively connected to kernel 1 HA component (104) and Kernel 2 HA component (124), respectively. OS A HA component 1 (112) and OS A HA component 2 (132) may send messages to, and receive messages from, kernel 1 HA component (104) and kernel 2 HA component (124), respectively, for the purposes of providing a high availability framework that enables OS A to run programs on a physical and/or virtual cluster. In one or more embodiments of the invention, OS A HA component 1 (112) is able to communicate directly with OS B HA component 1 (118). Similarly, OS A HA component 2 (132) may be able to communicate directly with OS B HA component 2 (138).

OS A HA component 1 (112) and OS A HA component 2 (132) use the same commands/communication structure as kernel 1 HA component (104) and kernel 2 HA component (124) because the versions of operating system and/or HA framework on which each are based is the same. Thus, no conversion is necessary for OS A HA component 1 (112) and OS A HA component 2 (132) to communicate with kernel 1 HA component (104) and kernel 2 HA component (124). Application A1 (110) and application A2 (130) may be any type of program or application. Specifically, application A1 (110) and application A2 (130) are distributed versions of the same application that provide high availability (i.e., failover protection) via the associated high availability frameworks.

Likewise, OS B userland 1 (114) and OS B userland 2 (134) provide an execution environment for all operating system applications and programs of OS B that execute out of the kernel (i.e., OS A kernel 1 (102) and OS A kernel 2 (122)). Application B1 (116) and application B2 (136) are applications that are executing within OS B userland 1 (114) and OS B userland 2 (134) Importantly, application B1 (116) and application B2 (136) need not be qualified to run in OS A userland 1 (108) or OS A userland 2 (128). In other words, application B1 (116) and application B2 (136) may only be able to execute within an operating environment of an old(er) version of an operating system yet, with the method of the present disclosure, application B1 (116) and application B2 (136) are able to leverage the functionality of the kernel of a new(er) operating system.

OS B HA component 1 (118) and OS B HA component 2 (138) are the high availability frameworks provided by the operating system of OS B userland 1 (114) and OS B userland 2 (134) (i.e., operating system B)). OS B HA component 1 (118) and OS B HA component 2 (138) are communicatively connected to kernel 1 HA component (104) and kernel 2 HA component (124), respectively. OS B HA component 1 (118) and OS B HA component 2 (138) send messages using the formatting used in their version of the operating system (i.e., OS B), and thus, the messages need to be processed by kernel 1 HA component (104) and/or kernel 2 HA component (124). In one or more embodiments of the invention, communication between HA framework components (i.e., OS A HA component 1 (112), OS B HA component 1 (118), OS A HA component 2 (132), OS B HA component 2 (138)) is not limited to message passing. Rather, communication between HA framework components may be through network packets, Inter-Process Communication (IPC) provided by the OS (i.e., OS A and/or OS B) such as doors, sockets, Remote Procedure Calls (RPC), and/or any other suitable mechanism.

Global cluster (144) is a virtualized cluster that provides an operating environment for the userlands within global cluster (144). Specifically, global cluster (144) is the primary virtualized cluster for some group of physical nodes, that is, every userland within global cluster (144) operates using the primary, or host, operating system for the given node. Similarly, zone cluster (146) is also a virtualized cluster. However, zone cluster (146) does not necessarily contain all physical nodes, and zone cluster (146) contains userlands that use operating systems different from the primary operating system for the given node.

Shared storage (148) may be any storage device including, but not limited to: a hard drive(s), database(s), solid state drive(s), memory, and/or any other suitable device or component. Shared storage (148) may reside on node 1 (100), node 2 (120), or may reside on a device or component separate from either node 1 (100) or node 2 (120). Further, shared storage (148) may be distributed across multiple nodes, devices, or components. In one or more embodiments of the invention, shared storage (148) is accessible via a network connection or other suitable connection, by any application or component of node 1 (100) and/or node 2 (120), including but not limited to: application A1 (110), application B1 (116), application A2 (130), and/or application B2 (136). In one or more embodiments of the invention, kernel 1 HA component (104) and kernel 2 HA component (124) include functionality to maintain data integrity by fencing off applications from changing data on shared storage (148) when the applications are running in a userland that is not part of cluster membership (i.e., OS B userland 1 (114) is fenced off from changing data that is being used by OS A userland 1 (108)). Further, in one or more embodiments of the invention, other components may include fencing functionality including, but not limited to: OS A HA component 1 (112), OS A HA component 2 (132), OS B HA component 1 (118), and/or OS B HA component 2 (138).

Figure 2:
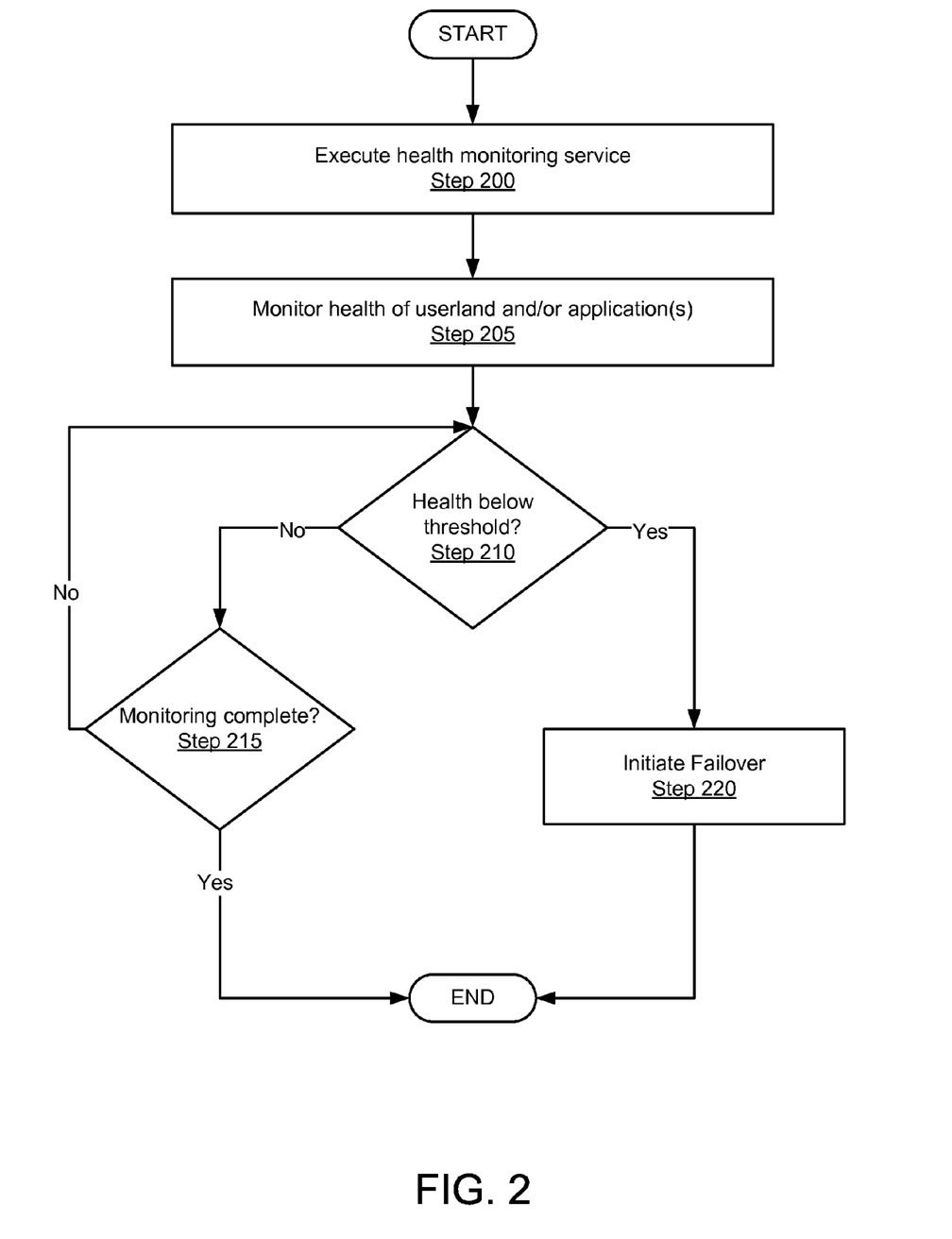
FIG. 2 shows a flowchart of a method in accordance with one or more embodiments of the invention.
Figure 3:
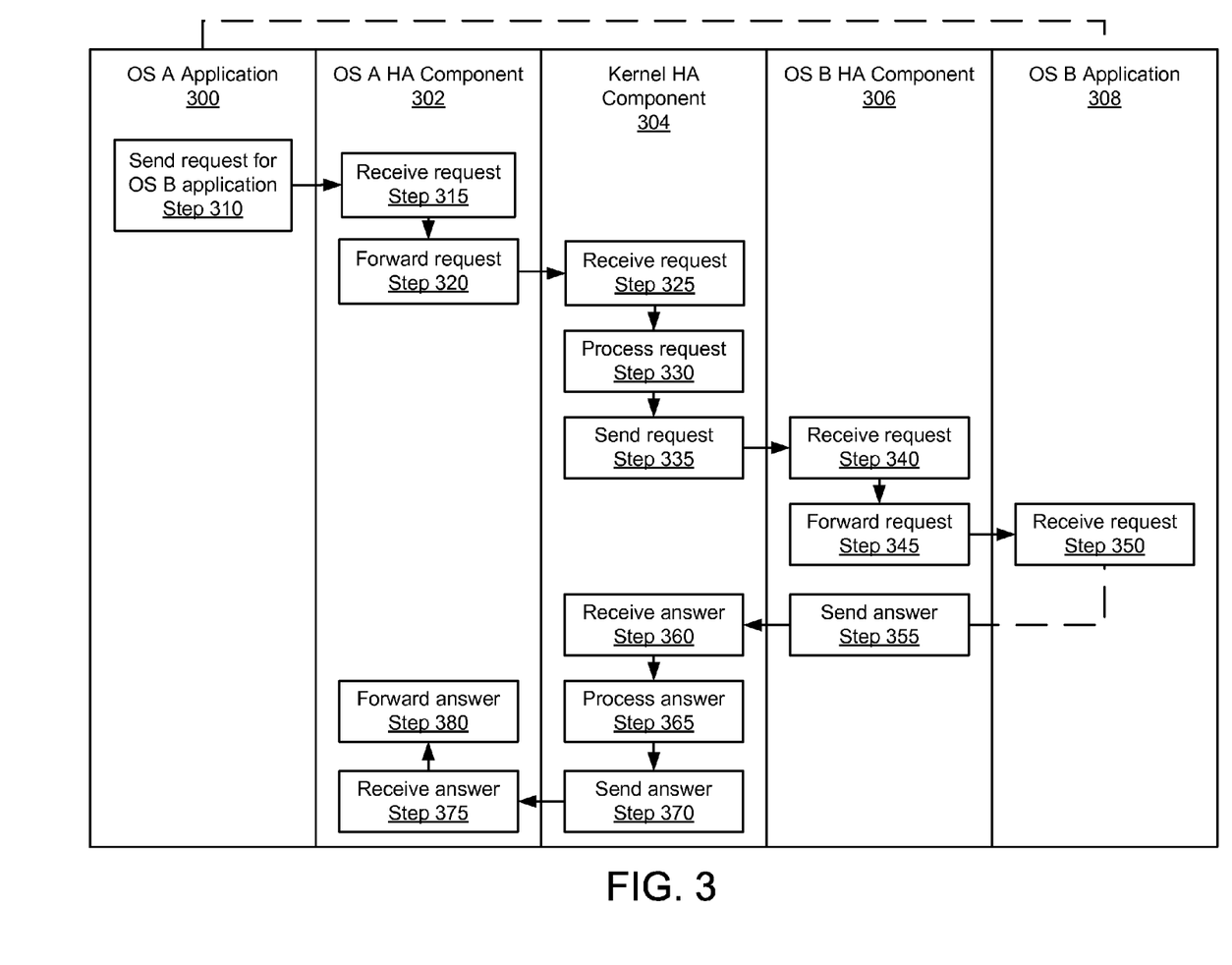
FIG. 3 shows a flowchart in accordance with one or more embodiments of the invention.

FIGS. 2 and 3 show flowcharts of a method for providing a high availability framework. While the various steps in this flowchart are presented and described sequentially, one of ordinary skill in the art will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIGS. 2 and 3 should not be construed as limiting the scope of the invention.

In Step 200, a health monitoring service is executed. The health monitoring service may execute within the kernel of the host operating system, and may provide monitoring to all operating systems executing on the same node.

In Step 205, health of a userland and/or application is monitored. Specifically, the health monitoring may monitor not only the status of userlands, but also the status of individual programs or applications executing within userlands. In other words, the userlands are not black boxes, as the health monitoring service is able to monitor the health of individual applications, even when they are executing within an operating system that is different from the one on which the health monitoring system is based.

In Step 210, a determination is made whether health of a monitored entity has fallen below a threshold. The threshold may be set by a user or administrator, and may be any value. If health has fallen below the threshold, the method proceeds to Step 220. If health has not fallen below the threshold, the method proceeds to Step 215.

In Step 215, a determination is made whether monitoring is complete. If the monitoring is complete, the method ends. If the monitoring is not complete, the method returns to Step 210.

In Step 220, failover is initiated. Specifically, regardless whether the failover is of an entire userland, or an individual application, and regardless whether the version of the operating system is the same version as the host operating system, failover is handled, at least in part, by components of the high availability framework within the kernel. Data integrity and/or storage protection may be provided by the HA framework in the kernel and the HA framework in the userland of the global cluster and/or the HA framework in the second operating system.

FIG. 3 shows a cross-functional flow chart showing the process of a request being sent from OS A application (300) to OS B application (308), and receiving the answer. FIG. 3 is an example of how one type of communication may occur between applications executing within different operating systems and the invention should not be limited to the steps or ordering of FIG. 3. Specifically, in FIG. 3, OS A application (300) is an application that is executing within the same operating system that provides the kernel, while OS B application (308) is executing on an older version of the operating system that provides the kernel. Further, there exists a dependency between OS A application (300) and OS B application (308), where OS A application (300) is unable to start without OS B application (308), and the two applications need to be collocated on the same node. Other components involved in the FIG. 3 are OS A HA component (302), Kernel HA component (304), and OS B HA component (306).

Initially, in Step 310, a request for OS B application (308) is sent from OS A application (300). Specifically, the request is for a fail over in which OS B application (308) needs to be stopped. In Step 315, the request is received by OS A HA component (302), which subsequently forwards the request (Step 320) to Kernel HA component (304). After Kernel HA component (304) receives the request (Step 325), the request is processed (Step 330). Processing may involve configuring the request into a form recognizable by the older operating system used by OS B HA component (306) and OS B application (308), and/or any other suitable steps. Next, the request is sent (Step 335) and OS B HA component (306) receives the request (Step 340). Subsequently, OS B HA component (306) forwards the request (Step 345), and OS B application receives the stop request (Step 350), and subsequently stops executing.

OS B HA component (306) recognizes that OS B application (308) has stopped executing, and sends an answer (Step 355) on to Kernel HA component (304). Kernel HA component (304) receives the answer (Step 360) and processes the answer (Step 365), typically in the opposite way as in Step 330 (e.g., converting the request into a form understandable by OS A). Then, the answer is sent (Step 370) to OS A HA component (302), which receives the answer (Step 375) and forwards the answer (Step 380) on to OS A application (300). In this example, the answer includes a request for OS A application (300) to stop executing, so that it may fail over. Finally, OS A application (300) stops.

Subsequent to the steps shown in FIG. 3, and not shown in FIG. 3, OS A HA component (302) communicates with its remote node counterpart in the cluster, and OS B application (308) is restarted and the OS A application (300) is finally restarted on a remote (i.e., different) node.

In one or more embodiments of the invention, the methods discussed above enable the establishment of dependencies between applications executing within different versions of the same operating system. For example, if program A is executing in operating system A, and program B is executing in operating system B, where operating system A is an older version of operating system B, and program A is unqualified to execute within operating system B, program A is able to establish a dependency on program B. The dependency may be anything. For example, the dependency could be on a feature or output of program B. Further, in one or more embodiments of the invention, the methods discussed above also enable a program to access features from another operating system, even when the program is unable to execute within the operating system providing the feature. Returning to the above example using programs A and B, program A could access a feature of operating system B that is not available in operating system A, even though program A is unable to execute within operating system B. Further, program A may benefit from any new features (if present) of the HA framework that is running on the newer operating system B. It will be apparent to one of ordinary skill in the art, having the benefit of this disclosure, that there are many ways to utilize the invention described in this application and, as such, the invention should not be limited to the above examples.

In one or more embodiments of the invention, additional functionality for installation of and/or upgrading of the HA framework software has also been improved. Specifically, installation of the HA framework software is typically done for one operating environment at a time. The HA framework installed on the various operating environments is the same as what would have been installed on a physical machine running the same operating environment as the virtual machine. In other words, no special accommodations need to be made for the virtual machine(s). For example, imagine that version 1 of an operating system is associated with HA framework version 1, while version 2 of an operating system is associated with HA framework version 2. Thus, in a machine where the host operating system is version 2 and the guest operating system is version 1, HA framework version 2 would be installed for the host, and HA framework version 1 would be installed for the guest operating system. When installing the HA framework to the secondary operating system, the installation is initiated from the primary operating system HA component, and an installation image for the HA component is created for the HA component that is intended to run inside the secondary operating system. This installation image is subsequently made visible from within the secondary operating system on all nodes that are configured to be part of the zone cluster, even though the initiation of the installation is from the primary operating system on one node. The actual installation of the installation image is then performed within the secondary operating system on each node remotely.

Thus, secondary operating systems may be patched and upgraded independently from the primary operating system. In other words, only the HA framework inside the secondary operating system may be brought down when patching and/or upgrading—the secondary operating system will continue to run, and will be recognized by the kernel HA component as "offline-running." If an incompatibility is detected as a result of the patching/upgrading, a reboot of the secondary operating system is performed and the secondary operating system is prevented from entering the "online-running" state until the incompatibility is resolved. It will be apparent to one of ordinary skill in the art that this invention makes the patch/upgrade steps efficient without compromising the availability of the components in the global cluster.

Figure 4:
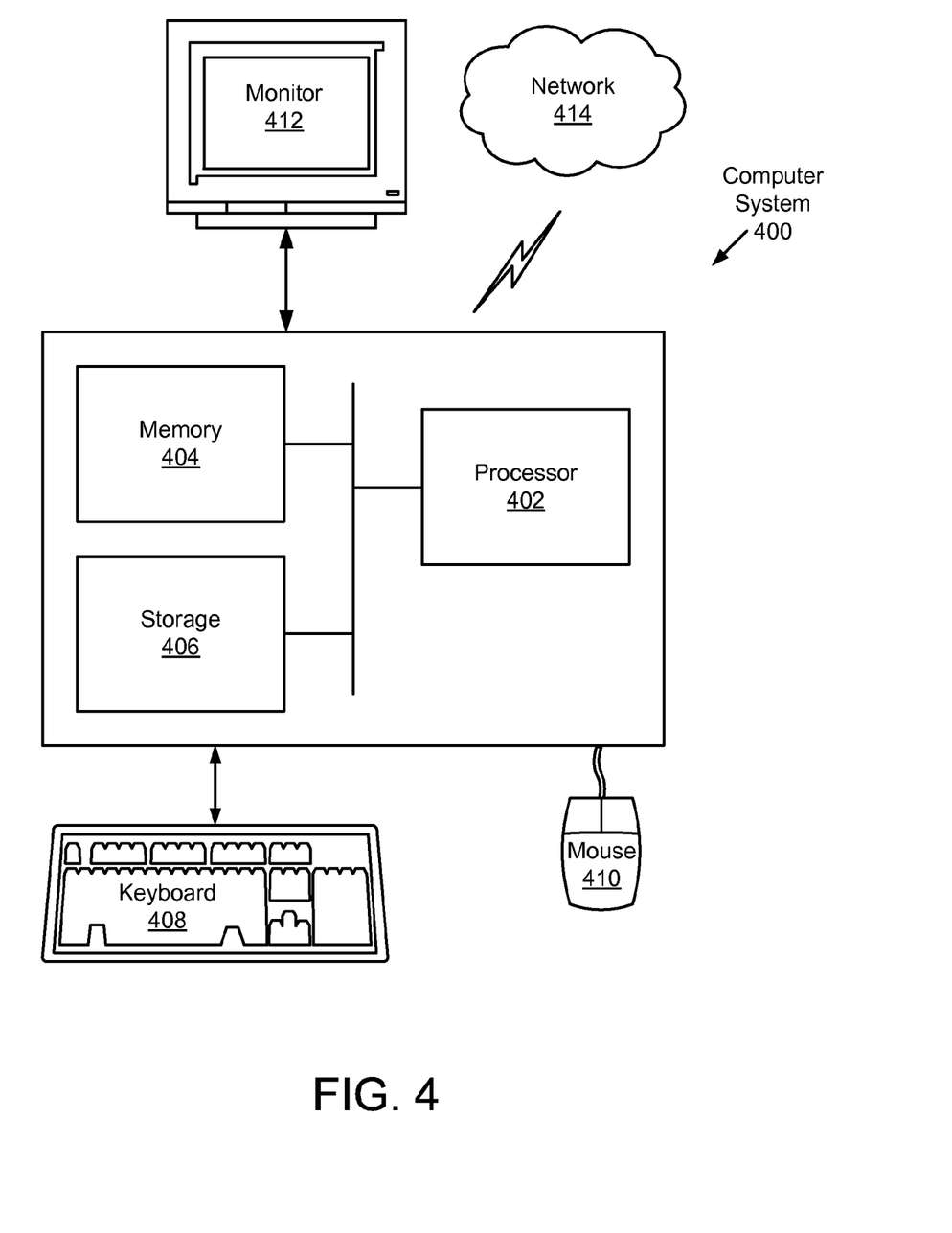
FIG. 4 shows a computer system in accordance with one or more embodiments of the invention.

Embodiments of the invention may be implemented on virtually any type of computer regardless of the platform being used. For example, as shown in FIG. 4, a Computer System (400) includes one or more Processor(s) (402) (such as a central processing unit (CPU), integrated circuit, hardware processor, etc.), associated Memory (404) (e.g., RAM, cache memory, flash memory, etc.), a Storage Device (406) (e.g., a hard disk, an optical drive such as a compact disk drive or digital video disk (DVD) drive, a flash memory stick, etc.), and numerous other elements and functionalities typical of today's computers (not shown). The Computer System (400) may also include input means, such as a Keyboard (408), a Mouse (410), or a microphone (not shown). Further, the Computer System (400) may include output means, such as a Monitor (412) (e.g., a liquid crystal display (LCD), a plasma display, or cathode ray tube (CRT) monitor). The Computer System (400) may be connected to a Network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the Computer System (400) includes at least the minimal processing, input, and/or output means necessary to practice embodiments of the invention.

Further, in one or more embodiments of the invention, one or more elements of the aforementioned Computer System (400) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing a high availability framework, comprising:
   executing a first component of the high availability framework within a shared kernel, wherein the shared kernel is based on a first operating system;

executing a second component of the high availability framework within a first userland of the first operating system;

executing a third component of the high availability framework within a second userland of a second operating system, wherein the second operating system is an older version of the first operating system, and wherein the shared kernel is used by and provides functionality to the first operating system and the second operating system;

monitoring, by a health service of the shared kernel, the first operating system and a first application executing within the first userland;

monitoring, by the health service, the second operating system and a second application executing within the second userland;

receiving, by the first component, a communication from the first application,
  wherein the communication is for the second application, and
  wherein the second application can not process the communication;

processing, by the first component, the communication to create a processed communication; and sending the processed communication to the second application.

2. The method of claim 1, wherein monitoring the first application comprises:
  restarting the first application without affecting the first userland.

3. The method of claim 1, further comprising:
  configuring a global cluster comprising the first operating system;
  executing a third application within the global cluster; and
  establishing, by the second application, a dependency on the third application executing within the global cluster.

4. The method of claim 1, further comprising:
  using, by the second application, a feature of first operating system, wherein the second operating system does not have the feature.

5. The method of claim 1, wherein the global cluster comprises a plurality of nodes.

6. The method of claim 5, wherein the plurality of nodes are virtual nodes.

7. The method of claim 1, further comprising:
  installing, in response to an initiation from the first operating system, the third component of the high availability framework in the second operating system by:
    creating an installation image for the third component within the second operating system;
    setting the installation image as visible for a plurality of nodes; and
    installing the third component using the installation image on each node of the plurality of nodes.

8. The method of claim 1, further comprising:
  updating the third component of the high availability framework, wherein the second operating system continues to run during updating, and the third component is brought down.

9. A non-transitory computer-readable medium (CRM) storing a plurality of instructions for providing a high availability framework, the plurality of instructions comprising functionality to:
  execute a first component of the high availability framework within a shared kernel, wherein the shared kernel is based on a first operating system;
  execute a second component of the high availability framework within a first userland of the first operating system;
  execute a third component of the high availability framework within a second userland of a second operating system, wherein the second operating system is an older version of the first operating system, and wherein the shared kernel is used by and provides functionality to the first operating system and the second operating system;
  monitor, by a health service of the shared kernel, the first operating system and a first application executing within the first userland;
  monitor, by the health service, the second operating system and a second application executing within the second userland;
  receive, by the first component, a communication from the first application,
    wherein the communication is for the second application, and
    wherein the second application can not process the communication;
  process, by the first component, the communication to create a processed communication; and
  send the processed communication to the second application.

10. The non-transitory CRM of claim 9, the instructions for monitoring the first application further comprising functionality to:
  restart the first application without affecting the first userland.

11. The non-transitory CRM of claim 9, the instructions comprising further functionality to:
  configure a global cluster comprising the first operating system;
  execute a third application within the global cluster; and
  establish, by the second application, a dependency on the third application executing within the global cluster.

12. The non-transitory CRM of claim 9, the instructions comprising further functionality to:
  use, by the second application, a feature of first operating system, wherein the second operating system does not have the feature.

13. The non-transitory CRM of claim 9, wherein the global cluster comprises a plurality of nodes.

14. The non-transitory CRM of claim 13, wherein the plurality of nodes are virtual nodes.

15. The non-transitory CRM of claim 9, the instructions comprising further functionality to:
  install, in response to an initiation from the first operating system, the third component of the high availability framework in the second operating system by:
    creating an installation image for the third component within the second operating system;
    setting the installation image as visible for a plurality of nodes; and
    installing the third component using the installation image on each node of the plurality of nodes.

16. The non-transitory CRM of claim 9, the instructions comprising further functionality to:
  update the third component of the high availability framework, wherein the second operating system continues to run during updating, and the third component is brought down.

17. A system for providing a high availability framework, comprising:
  a plurality of nodes, each comprising a processor and a memory, the memory comprising instructions which, when executed by the processor, comprise functionality to:

execute a first component of the high availability framework within a shared kernel, wherein the shared kernel is based on a first operating system;
execute a second component of the high availability framework within a first userland of the first operating system;
execute a third component of the high availability framework within a second userland of a second operating system, wherein the second operating system is an older version of the first operating system, and wherein the shared kernel is used by and provides functionality to the first operating system and the second operating system;
monitor, by a health service of the shared kernel, the first operating system and a first application executing within the first userland;
monitor, by the health service, the second operating system and a second application executing within the second userland;
receive, by the first component, a communication from the first application,
 wherein the communication is for the second application, and
 wherein the second application can not process the communication;
process, by the first component, the communication to create a processed communication;
send the processed communication to the second application; and
a shared storage device, wherein the first operating system and the second operating system perform failure fencing on the shared storage device to maintain integrity of the shared storage device.

18. The system of claim 17, wherein monitoring the first application further comprises functionality to:
restart the first application without affecting the first userland.

19. The system of claim 17, further comprising functionality to:
configure a global cluster comprising the first operating system;
execute a third application within the global cluster; and
establish, by the second application, a dependency on the third application executing within the global cluster.

20. The system of claim 17, further comprising functionality to:
use, by the second application, a feature of first operating system, wherein the second operating system does not have the feature.

21. The system of claim 17, wherein the global cluster comprises a plurality of nodes.

22. The system of claim 17, further comprising functionality to:
install, in response to an initiation from the first operating system, the third component of the high availability framework in the second operating system by:
 creating an installation image for the third component within the second operating system;
 setting the installation image as visible for a plurality of nodes; and
 installing the third component using the installation image on each node of the plurality of nodes.

23. The system of claim 17, further comprising functionality to:
update the third component of the high availability framework, wherein the second operating system continues to run during updating, and the third component is brought down.

\* \* \* \* \*